Patented June 24, 1930

1,766,814

UNITED STATES PATENT OFFICE

HARRY C. FISHER, OF LOCKLAND, OHIO, ASSIGNOR, BY MESNE ASSIGNMENTS, TO THE PHILIP CAREY MANUFACTURING COMPANY, A CORPORATION OF OHIO

PROCESS FOR COLORING MINERAL GRANULES

No Drawing. Application filed October 13, 1926. Serial No. 141,431.

My invention relates to processes for coloring granular material for use particularly as a surfacing for prepared roofing. From this point of view, my invention has been particularly developed for application of color to slate granules which are superior for a surfacing for roofs, and relates to the formation of a surface of color on the granular material.

The requirements of a process for coloring slate for roofing purposes, are large quantity production by continuous process, a treatment which will handle material that is already granulated, a surfacing agent which is inexpensive, and the fixation of which will not cause granular material to form solid balls, and finally a finished product which is attractive in color appearance, and will withstand the weather.

I have hitherto developed two processes for coloring slate granules in which a silicate is used for the superimposed coat on the granules. I have described these processes in various patent applications among which Nos. 26,829 and 22,878 are typical. In one of these processes, sodium silicate with a factor of around 1 sodium oxide ($Na_2O$) to 3.25 silica ($SiO_2$) is employed and the granules are treated with the water solution thereof, and heated in a continuous process to beyond the point of dehydration. In another of the processes, sodium silicate and a metal salt are used with a similar application and heat treatment resulting in forming an insoluble metal glass, as distinguished from a dehydrated silicate of sodium, on the granules.

My present invention departs from both of the two previous processes in that essentially I form a sodium silicate glass on the granules, by which I mean a re-fused glassy coating, or glaze, though of a water-soluble silicate, rather than a whitened intumesced, but dehydrated condition of the same.

One of the advantageous characteristics of the first process above briefly referred to is that a sodium silicate which is heated as thin film on granular material will take on, when heated rapidly, an intumesced condition of puffy whiteness, which of itself serves by its opacity to obscure the under color of the slate granules, without requiring pigment for that purpose, and hence can be used in small quantities with a completely effective color coat resulting, whereas, with the transparent materials, to obtain a light shaded color which will satisfactorily avoid the drab appearance caused by the application of heat to slate, the expensive pigments themselves must be used not only in quantity sufficient to give the desired color, but also in additional quantity sufficient to obscure the drabness showing through the transparent adhesive binder.

Any process for coloring slate granules for use as a surfacing for roofing must, for economy's sake, conserve the amount of pigment employed, and should use inexpensive coatings and pigments such as sodium silicate and iron and chromium salts and oxides, and hence in the development of my processes I have in each instance provided a coloring method which permits of use of agents which can be obtained in large quantities at fairly low cost. I do not limit my processes to the use of inexpensive, common materials, however, but do regard this as a very valuable feature of them.

I have found that if sodium silicate is applied to slate granules in a water vehicle, and in the presence of pigments, and is brought through a rotary kiln, with a counterflow of heated products of combustion, so as to reach the intumesced stage, and is finally brought to a considerably higher temperature, that the silicate will melt and flow down into a glaze, returning to the condition of the silicate glass during the process of production before it is forced into water solution.

In this condition, the coating is more resistant to abrasion than the intumesced silicate coating, and has a brilliance or shine that is also absent from the intumesced coating. The re-fused silicate coating also combines with the surface of the slate to an appreciable degree, which combination not only increases its resistance to abrasion, but causes it to be colored by interaction with coloring oxides, principally of iron, present in the slate. It is more expensive, in that more pigment must be employed or only the darker shades of brown, red and green, etc. can be obtained, because of the chemical combination mentioned above, or because of the drab color of the slate showing through it.

However, there is some limitation of temperature, due to this influence on the shade of color by the slate itself beneath the glaze, and hence some flux to permit a lower final temperature is preferably added to the silicate. On the other hand, the introduction of some fluxes increases the tendency for reaction with coloring oxides in the slate, and, as is well known, changes the nature of the glaze and its color; therefore, for any given color process, the two factors, temperature and flux, must be carefully balanced.

I have found that if the composition of the glaze, coloring materials, and temperature are carefully balanced, the heat treatment in the kilns can be carried out so that the granules can be thoroughly coated with a glaze and yet will not adhere to each other in balls so much that they cannot be easily separated from one another, as by gentle crushing, if they are rapidly cooled after emerging from the kiln.

I will describe four typical formulæ for producing dark green, dark red, black and dark brown colored slate. In these processes I employ a long rotary kiln, into which the materials are fed at one end, and with burners at the opposite end by means of which heat is provided. For these particular formulæ, oxidizing atmospheres are required, and in practice, oxidizing atmospheres are easily maintained. Neutral or reducing atmospheres can be used; but produce effects peculiar to themselves, and not the effects desired in the formulæ given. The slate is first wetted with the materials employed, then dumped into the kiln through which it is fed along in counterflow to the flow of products of combustion, passing out through the base of the kiln near the flame entrance, where it is cooled in air.

It should be understood that the materials employed are given as typical of materials of like nature, which will behave in a similar manner under application of heat.

Proportions are given which may be increased as desired, sufficient of the materials being provided for one ton of slate. The silicate used will be, in the examples given, a 43 degrees Bé. 1:3.25 silicate.

For dark glazed green slate granules, 160 pounds of the silicate, 16 pounds of chromic oxide, 50 pounds of borax and 100 pounds of water. These materials are applied to the granulated slate and the kiln treatment imparted thereto. At the stage of the kiln when the silicate has intumesced and dried, the color of the granules will be a light green, but sufficient heat is applied to raise the granules to between 1,500 and 1,600 degrees Fahrenheit, with the result of producing a dark olive green glazed granule. In the kiln, a continual agitation prevents agglomeration, and although the granules issue therefrom at a high temperature, rapid cooling in air renders the coatings non-adhesive in such a fashion as to permit the ready separation of any agglomerated masses which may have formed.

For a dull red glazed slate, 160 pounds of silicate, 50 of borax, 40 of red iron oxide, and 100 pounds of water, will give satisfatory results, with final temperature at 1,350 to 1,400 degrees Fahrenheit.

For glazed black slate, when the color is derived from coloring constituents in the slate itself, no coloring matter is used, and a higher degree of heating is required. For this color, 100 pounds of silicate, 60 pounds of borax, and 100 pounds of water, will color one ton of granulated slate to a glazed black, by a kiln treatment in which the final temperature is 1,700 degrees Fahrenheit. At lower temperatures, the tendency is to produce dark browns.

For brownish black slate, 200 pounds silicate, 4 pounds sodium dichromate, 60 pounds borax, 100 pounds of water, with the final temperature around 1,500 degrees Fahrenheit, will impart a glazed color in which the yellow effect of the dichromate reaction will result, together with the brown from the slate, in the desired shade. In this formula the dichromate decomposes into chromic acid, which alone would make the glaze yellowish, if it were not for the color of the glaze being made dark brownish by reaction with materials in the slate during the fusion of the intumesced silicate.

My process differs radically from pottery or ceramic glazing with colors, in the rapidity of the heat application and rapidity of cooling together with the use of an originally granular base, which are essential to a successful and economical granular slate coloring process. Also, I am not aware of anyone having imparted a glaze to pottery by causing a melting and flowing of an originally wet sodium silicate coating.

Having thus described my invention, what I claim as new and desire to secure by Letters Patent is:—

1. That process of coloring granular mineral matter which will withstand a roasting treatment, which consists in wetting the granules with a water-soluble silicate and heating said granules with agitation through a stage where the silicate becomes intumesced to a stage when it flows into a fused glaze upon the granules.

2. That process of coloring granular mineral matter which will withstand a roasting treatment, which consists in wetting the granules with a water-soluble silicate and heating said granules with agitation through a stage where the silicate becomes intumesced to a stage when it flows into a fused glaze upon the granules, and finally cooling in air.

3. That process of coloring granular mineral matter which will withstand a roasting treatment, which consists in wetting the granules with a water-soluble silicate together with a coloring agent, and heating said granules with agitation through a stage where the silicate becomes intumesced to a stage when it flows into a fused glaze upon the granules.

4. That process of coloring granular mineral matter which will withstand a roasting treatment, which consists in wetting the granules with a water-soluble silicate together with a coloring agent, and heating said granules with agitation through a stage where the silicate becomes intumesced to a stage when it flows into a fused glaze upon the granules, and finally cooling in air.

5. That process of coloring granular mineral matter which will withstand a roasting treatment, which consists in wetting the granules with a water-soluble silicate in the presence of a flux, and heating said granules with agitation through a stage where the silicate becomes intumesced to a stage when it flows into a fused glaze upon the granules.

6. That process of coloring granular mineral matter which will withstand a roasting treatment, which consists in wetting the granules with a water-soluble silicate in the presence of a flux, and heating said granules with agitation through a stage where the silicate becomes intumesced to a stage when it flows into a fused glaze upon the granules, and finally cooling in air.

7. That process of coloring granular mineral matter which will withstand a roasting treatment, which consists in wetting the granules with a water-soluble silicate together with a coloring agent in the presence of a flux, and heating said granules with agitation through a stage where the silicate becomes intumesced to a stage when it flows into a fused glaze upon the granules.

8. That process of coloring granular mineral matter which will withstand a roasting treatment, which consists in wetting the granules with a water-soluble silicate together with a coloring agent in the presence of a flux, and heating said granules with agitation through a stage where the silicate becomes intumesced to a stage when it flows into a fused glaze upon the granules, and finally cooling in air.

9. That process of coloring granular slate, which consists in coating the granular slate with a water-soluble silicate and fusing this silicate into a glass by application of high heat.

10. That process of coloring granular mineral matter which will withstand a roasting treatment, which consists in wetting the granules with a water-soluble silicate and heating said granules with agitation through a stage where the silicate becomes intumesced to a stage when it flows into a fused glaze upon the granules, said silicate being concentrated and dissolved in water of less than three quarters the weight of the silicate.

HARRY C. FISHER.